US009754095B2

(12) United States Patent
Kapp et al.

(10) Patent No.: US 9,754,095 B2
(45) Date of Patent: *Sep. 5, 2017

(54) UNLOCKING ELECTRONIC DEVICES USING TOUCHSCREEN INPUT GESTURES

(71) Applicant: International Business Machines Corporation, Armonk, NY (US)

(72) Inventors: Jeffrey L. Kapp, Vail, AZ (US); Martin A. Tiernan, Tucson, AZ (US); Zhi Qiang Wei, Shanghai (CN); Xiao Qing Zhang, Tucson, AZ (US); Cheng Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/403,204

(22) Filed: Jan. 11, 2017

(65) Prior Publication Data

US 2017/0116407 A1     Apr. 27, 2017

Related U.S. Application Data

(63) Continuation of application No. 14/270,438, filed on May 6, 2014.

(51) Int. Cl.
*G06F 3/0488* (2013.01)
*G06F 21/36* (2013.01)

(52) U.S. Cl.
CPC .......... *G06F 21/36* (2013.01); *G06F 3/04883* (2013.01)

(58) Field of Classification Search
CPC ............................. G06F 3/0488; G06F 21/36
(Continued)

(56) References Cited

U.S. PATENT DOCUMENTS 6,571,336 B1   5/2003   Smith, Jr.
8,136,053 B1   3/2012   Miller et al.
(Continued)

FOREIGN PATENT DOCUMENTS

CN    104424406 A    3/2015
EP    2506183 A1    10/2012
(Continued)

OTHER PUBLICATIONS

Unknown, "MazeLock," Think Change, retrieved on Sep. 26, 2013, last accessed May 6, 2014, 2 pages http://www.thinkchange.mobi/symbian-softwares-s60v5-mazelock-overview.html.
(Continued)

*Primary Examiner* — Andrea Leggett
(74) *Attorney, Agent, or Firm* — Nicholas D. Bowman

(57) ABSTRACT

A computer implemented method for detecting input gesture events on a touchscreen of an electronic device and for unlocking the electronic device is disclosed. The method may include displaying, while the electronic device is in a locked state, a plurality of guidance lines on the touchscreen of the electronic device, detecting, during an input gesture event, guidance line crossings and calculating a number of guidance line crossings detected during the input gesture event. The method may also include converting a calculated number of detected guidance line crossings into at least one password digit, comparing a sequence of password digits to a stored password in the electronic device and unlocking, in response to comparing the sequence of password digits to the stored password, the electronic device.

1 Claim, 8 Drawing Sheets

(58) Field of Classification Search
USPC .......................................................... 715/863
See application file for complete search history.

(56) References Cited

U.S. PATENT DOCUMENTS

| | | | |
|---|---|---|---|
| 8,176,547 | B2 | 5/2012 | McKeeth |
| 8,504,842 | B1 | 8/2013 | Meacham |
| 8,638,939 | B1* | 1/2014 | Casey ..................... G06F 21/36 380/277 |
| 8,904,479 | B1* | 12/2014 | Johansson ............... G06F 21/36 382/181 |
| 9,471,761 | B2 | 10/2016 | Kapp et al. |
| 2002/0109677 | A1 | 8/2002 | Taylor |
| 2006/0174339 | A1 | 8/2006 | Tao |
| 2010/0031200 | A1 | 2/2010 | Chen |
| 2011/0161892 | A1* | 6/2011 | Hamadene .......... G06F 3/04845 715/863 |
| 2011/0260829 | A1 | 10/2011 | Lee |
| 2012/0066650 | A1 | 3/2012 | Tirpak et al. |
| 2012/0252410 | A1 | 10/2012 | Williams |
| 2013/0080960 | A1 | 3/2013 | McRae et al. |
| 2013/0234971 | A1* | 9/2013 | Li ....................... G06F 3/04883 345/173 |
| 2014/0365903 | A1* | 12/2014 | Seo ..................... G06F 3/04883 715/741 |
| 2015/0058915 | A1* | 2/2015 | Chung ................... G06F 21/45 726/1 |
| 2015/0324113 | A1 | 11/2015 | Kapp et al. |
| 2016/0054884 | A1* | 2/2016 | Gay ....................... G06F 21/36 715/863 |

FOREIGN PATENT DOCUMENTS

| | | |
|---|---|---|
| JP | 2013016115 A | 1/2013 |
| KR | 20120109429 A | 10/2012 |
| KR | 1020150103507 A | 9/2015 |

OTHER PUBLICATIONS

Kapp et al., "Unlocking Electronic Devices Using Touchscreen Input Gestures", U.S. Appl. No. 15/403,205, filed Jan. 11, 2017.

IBM, List of IBM Patents or Patent Applications Treated as Related, Jan. 9, 2017, 2 pages.

U.S. Appl. No. 15/068,714, Accelerated Examination Support Document, Dated May 31, 2016, 11 pages.

U.S. Appl. No. 15/403,205, Accelerated Examination Support Document, Dated Jan. 6, 2017, 14 pages.

* cited by examiner

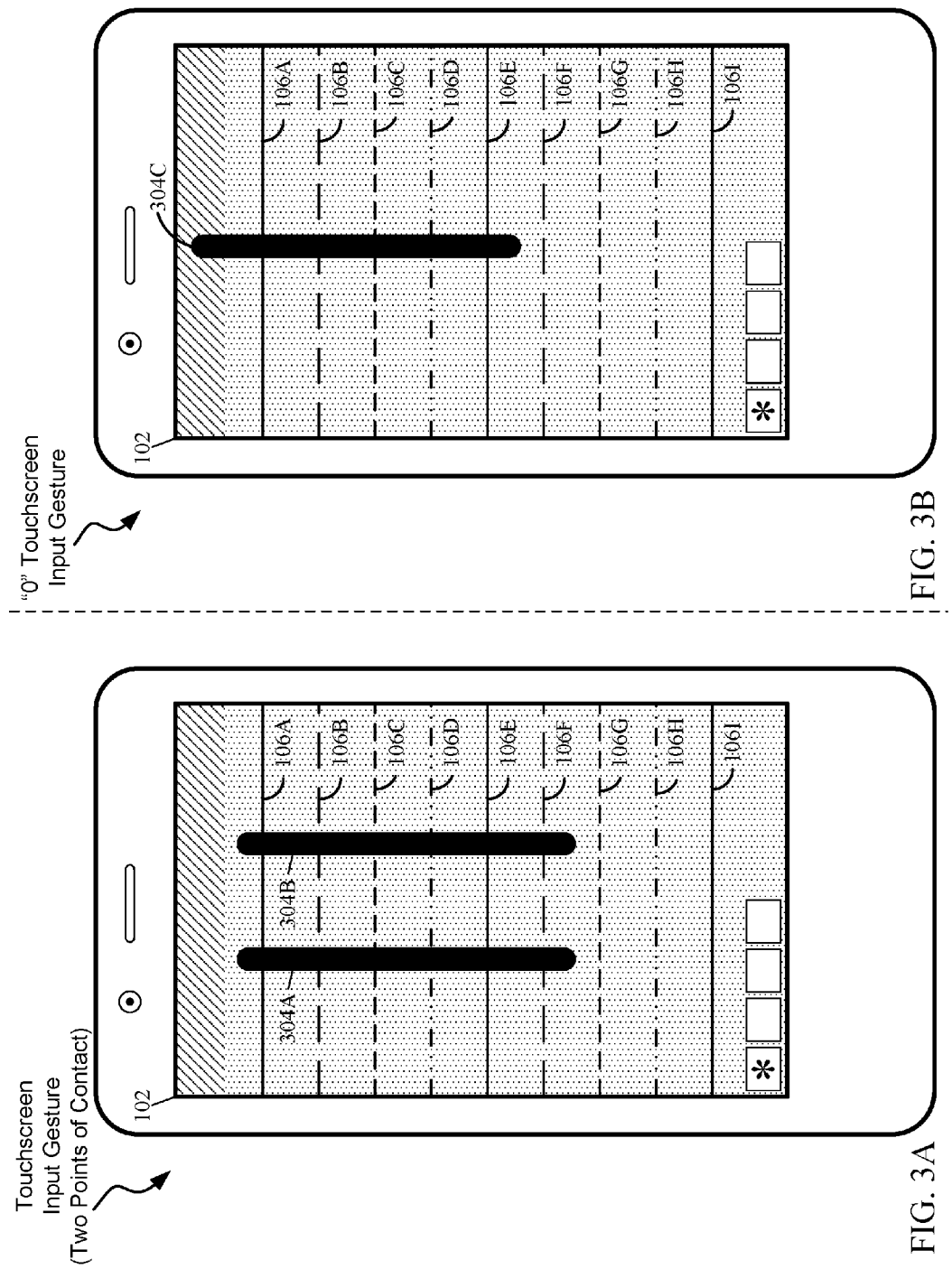

UNLOCKING ELECTRONIC DEVICES USING TOUCHSCREEN INPUT GESTURES

BACKGROUND

The present disclosure relates to unlocking an electronic device. In particular, this disclosure relates to detecting touchscreen input gestures and converting them to password characters used to unlock a touchscreen device.

A touchscreen may be an electronic visual display that a user can control through simple or multi-touch gestures, by touching the screen with one or more fingers or a stylus or pen. Some touchscreens may respond to finger touches and gestures, while others may be designed to respond to a special stylus or pen. The user may use the touchscreen as an input device to interact directly with information displayed on the screen, and possibly to control how it is displayed. For example, selection choices from a menu displayed on the touchscreen may be received by the touchscreen, or the size of a displayed image, such as a map, may be altered through touchscreen input gestures.

Touchscreens may be found in a variety of applications where keyboard and mouse input devices may not allow a suitably intuitive, rapid, or accurate interaction by the user with the display's content. For example, touch screens may be common in devices such as smartphones, tablet computers, all-in-one computers, game consoles and automatic teller machines (ATMs). They can also be attached to computers or, as terminals, to networks. Touchscreens may play a prominent role in the design of digital appliances such as personal digital assistants (PDAs), satellite navigation devices, mobile phones, video games and e-books (electronic books).

A password may be a word or sequence of characters used to provide user authentication, to allow a user to gain access to an electronic resource or device. For example, a computer user may specify a password having a customizable number and sequence of characters that must be entered before access to the computer is allowed. A password may be a form of an electronic "key" that allows an authorized user to access an electronic device, while preventing unwanted or unauthorized users from accessing the device. A password may generally be short enough to be easily memorized and entered into an electronic device.

SUMMARY

Various aspects of the present disclosure may be useful for providing enhanced password security for an electronic device having a touchscreen. An electronic device configured according to embodiments of the present disclosure may, as a result of obfuscation of a password entered through one or more gestures on the electronic device's touchscreen, have a high level of security against unauthorized access.

Embodiments may be directed towards a computer implemented method for detecting input gesture events on a touchscreen of an electronic device and for unlocking the electronic device. The method may include displaying, while the electronic device is in a locked state, a plurality of guidance lines on the touchscreen of the electronic device, detecting, during an input gesture event, guidance line crossings, and calculating a number of guidance line crossings detected during the input gesture event. The method may also include converting a calculated number of detected guidance line crossings into at least one password digit, comparing a sequence of password digits to a stored password in the electronic device, and unlocking, in response to comparing the sequence of password digits to the stored password, the electronic device.

Embodiments may also be directed towards an electronic device. The electronic device may include a touchscreen display, configured to display, while the electronic device is in a locked state, a plurality of guidance lines, and to detect, during an input gesture event, guidance line crossings. The electronic device may also include one or more processor circuits, configured to calculate a number of guidance line crossings detected during the input gesture event, and convert a calculated number of detected guidance line crossings into at least one password digit. The processor circuits may also be configured to compare a sequence of password digits to a stored password in the electronic device, and to unlock, in response to the compare of the sequence of password digits to the stored password, the electronic device.

Embodiments may also be directed towards a computer program product for detecting input gesture events on a touchscreen of an electronic device and for unlocking the electronic device. The computer program product may include a computer readable storage medium having program instructions stored thereon. The program instructions may be executable by a device [e.g., computer, processor, processor circuit, etc.] to cause the device to display, while the electronic device is in a locked state, a plurality of guidance lines on the touchscreen of the electronic device. The program instructions may also cause the device to detect, during an input gesture event, guidance line crossings, calculate a number of guidance line crossings detected during the input gesture event and convert a calculated number of detected guidance line crossings into at least one password digit. The program instructions may also cause the device to compare a sequence of password digits to a stored password in the electronic device, and unlock, in response to the compare of the sequence of password digits to a stored password, the electronic device.

Aspects of the various embodiments may be used to conceal a password, entered by the user of an electronic device, from unauthorized users who may observe the password being entered. Aspects of the various embodiments may also be useful for providing a cost-effective password security enhancement for use with a wide variety of touchscreen electronic devices, by using existing and proven software and electronic hardware technologies and design practices.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3A depicts a touchscreen input gesture having 2 points of contact, according to embodiments.

FIG. 3B depicts a "0" touchscreen input gesture, according to embodiments.

Figure 1B:
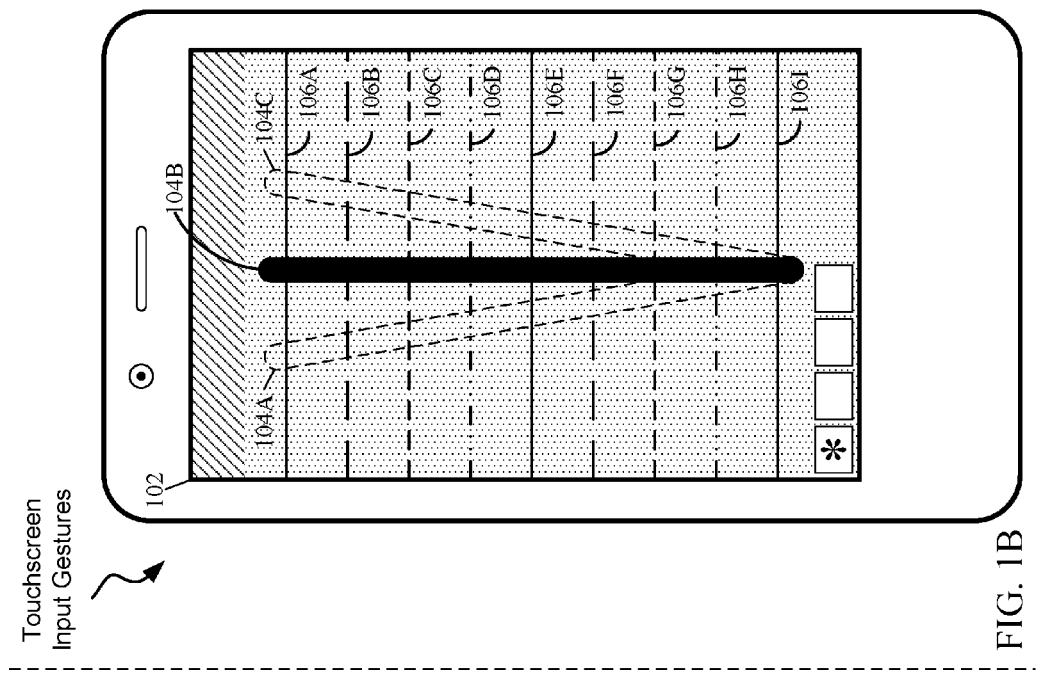
FIG. 1B depicts touchscreen input gestures, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing enhanced password security for mobile digital devices with touchscreens such as smartphones, personal digital assistants (PDAs), satellite navigation devices (GPS units) and electronic books. Such mobile digital devices may contain sensitive and valuable user data such as personal identity and financial information. While not necessarily limited thereto, embodiments discussed in this context can facilitate an understanding of various aspects of the disclosure. Certain embodiments may also be directed towards other equipment and associated applications, such as providing enhanced password security for computers, which may be used in a wide variety of personal and commercial applications. Such computers may include, but are not limited to tablet, touchscreen or all-in-one computers. Embodiments may also be directed towards providing enhanced password security for publicly available electronic devices such as automated teller machines (ATMs), kiosk computers and permanently installed security and automation systems.

For ease of discussion and illustration, the term "smartphone" is used herein, however, it is understood that various embodiments can also be useful with regards to other electronic devices and systems such as tablet computers, personal digital assistants (PDAs), automatic teller machines (ATMs), publicly accessible computer kiosks, or other electronic devices or systems where password obfuscation may be desirable.

Various embodiments of the present disclosure relate to a method of entering passwords into a touchscreen electronic device, which may conceal the entered password from individuals who may observe electronic device during password entry. The password entry method may therefore be useful for providing enhanced security of electronic devices which may be accessed in view of unauthorized users. Enhanced electronic data security may result from the use of the password entry method. The password entry method may also be useful in providing authorized users with the ability to rapidly access touchscreen electronic devices and systems through touchscreen input gestures which may be easily memorized, and which may be difficult for an unauthorized user to recognize and replicate. A password entry method according to embodiments may have cost advantages over certain authentication methods such as biometric identification.

A password entry method implemented according to certain embodiments may be compatible with existing and proven touchscreen electronic devices, and may be a useful and cost-effective way to protect sensitive and valuable data. A password entry method constructed according to embodiments of the present disclosure may be implemented on a variety of existing electronic devices and systems.

Portable electronic devices such as smartphones and PDAs have become very popular and widely adopted as a result of an extensive range of capabilities and benefits they can offer users. Capabilities such as convenient, mobile access to the Internet for web browsing, sending and receiving email, instant messaging, texting, video communication, and a wide range of available applications have incented many portable device owners to use their smartphone (or other portable electronic device) for tasks and functions formerly only performed on a computer. Online banking, shopping, stock trading, small business management, and many types of personal and commercial communication are now performed reliably and regularly using portable devices such as smartphones.

The growing popularity of mobile devices has precipitated an increase in the amount of private and sensitive data that is stored on, and transferred through, devices such as smartphones. Vulnerable data may include identity-related items such as names, phone numbers, addresses and Social Security numbers, and financial data such as bank account and credit card numbers. While having these types of sensitive data on a small, conveniently mobile device is advantageous to many users, it also presents significant security risks. A compromised smartphone password, for example, may result in identity theft, or many types of fraudulent, criminal activities, resulting from data accessed or retrieved from a smartphone by an unauthorized user.

A smartphone password may be entered by simply typing numbers onto a keypad displayed on a touchscreen, or by using keys on a keypad. While these methods of password entry may be effective, they may also be easily observed by a nearby, unauthorized user of the smartphone, who may recognize the entered password, and may take advantage of it at a later time.

Similarly, a password may be entered through an input gesture having a certain geometric pattern or shape. These methods, however, may also be observed and recognized, which may allow the recognized pattern to be used to gain unauthorized access to a smartphone or other mobile device.

Certain embodiments of the present disclosure relate to a method for unlocking a touchscreen electronic device by the device receiving touchscreen input gestures that may be concealed from an unauthorized user, and converting them to password digits to unlock the device.

Figure 1A:
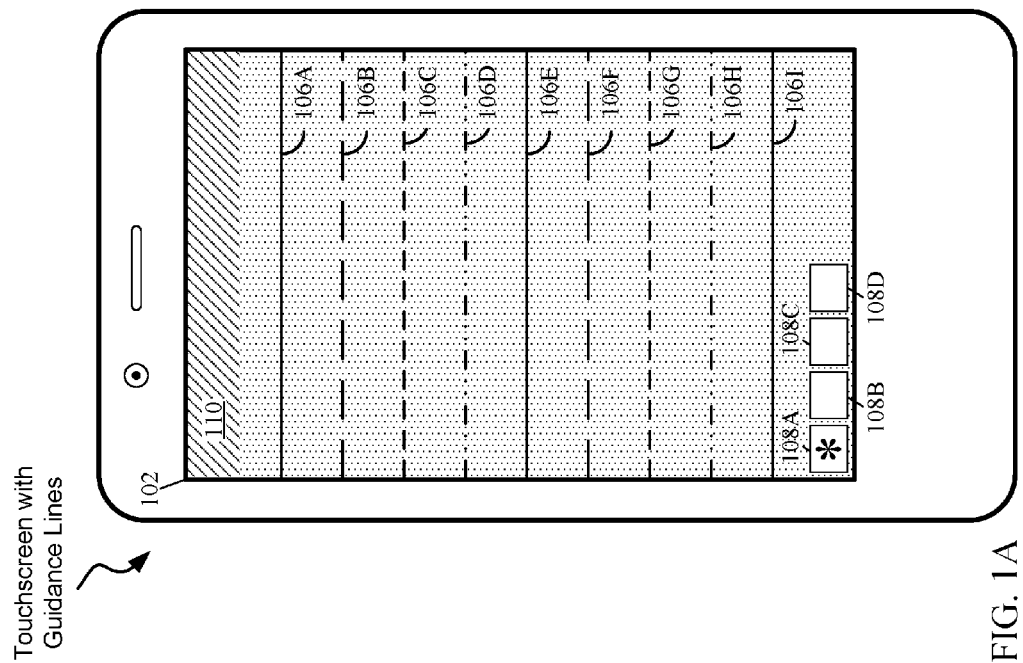
FIG. 1A depicts a touchscreen with displayed guidance lines, according to embodiments of the present disclosure.

FIG. 1A depicts a touchscreen 102 of an electronic device such as a smartphone or PDA, with (straight) displayed guidance lines 106A . . . 106I, according to embodiments of the present disclosure. A user of the electronic device may, through touchscreen input gestures, enter characters of a password used to unlock the electronic device, according to embodiments of the present disclosure. Touch screen 102 input gestures and associated password characters, entered into the electronic device, may be concealed from individuals other than an authorized user, according to embodiments. A touchscreen input gesture may be converted into one or more password characters, in response to a number of guidance lines 106A . . . 106I crossed by the input gesture, according to embodiments Touchscreen 102 may be generally useful for displaying data from and receiving user input to an electronic device. Guidance lines 106A . . . 106I may be useful in defining guidance line crossings resulting from user input gestures. Guidance lines 106A . . . 106I may be displayed when the electronic device is in a locked state, and may have a variety of shapes, colors, widths, orientations, positions and spacings, which may be useful in concealing a password character, represented by a touchscreen input gesture, according to embodiments. For example, guidance line 106A may be colored red, guidance line 106B may be colored yellow, guidance line 106G may be colored green, and guidance line 106D may be colored blue, according to embodiments. Differentiation of guidance lines from adjacent guidance lines through variation of colors, thicknesses or other characteristics may enable an electronic device user to easily memorize touchscreen input gestures used for password entry into the device. The guidance line 106A . . . 106I characteristics of may be varied to make guidance lines 106A . . . 106I visible to a user, positioned near the electronic device, while restricting their visibility to other, nearby individuals.

Touchscreen 102 is depicted displaying password cubicles 108A . . . 108D, which may be useful to provide user feedback indicating one or more received password characters, in response to touchscreen input gestures. For example, the electronic device may signal to the user that it has received a password character, by displaying a symbol or character (e.g.; an asterisk) in a formerly empty password cubicle. FIG. 1A depicts 4 password cubicles (108A . . . 108D); however, other numbers of password cubicles may be possible.

The "0" input area 110 may be used in conjunction with entering a "0" character as part of a password. An input gesture that includes contact with the touchscreen 102 in a "0" input area 110 may be translated by the electronic device as a "0" password character, according to embodiments.

FIG. 1B depicts a touchscreen 102 with input gestures 104A . . . 104C and displayed guidance lines 106A . . . 106I, consistent with FIG. 1A, according to embodiments. In certain embodiments, a touchscreen input gesture may be translated into one password digit corresponding to the number of guidance line (e.g.; 106A . . . 106I) crossings detected and calculated by the electronic device during the gesture. For example, the input gesture 104B, which may cross 9 guidance lines (106A . . . 106I), may be converted to a password digit of "9", according to embodiments. Detecting a guidance line crossing may include detecting the transition of an input gesture event from a first side of a guidance line to a second side of the guidance line.

In certain embodiments converting the number of detected guidance line crossings into at least one password digit further may also include multiplying the number of detected guidance line crossings by a numerical weighting value, which may be stored within the electronic device. For example, if the numerical weighting value is 2, and the number of detected guidance line crossings is 9, then the calculated number of guidance line crossings will be 18, which may be subsequently converted into two sequential password digits of "1" and "8". Other numerical weighting factors and corresponding number of converted password digits are possible.

Input gestures 104A and 104C depict variations of input gesture 104B, having different orientations than input gesture 104B, however the number of guidance line crossings resulting from any of the 3 depicted input gestures (104A . . . 104C) may be 9. Similarly, the number of guidance line crossings that may be detected for a particular input gesture (e.g.; 104B) may be independent of the direction of the gesture. In embodiments, a variety of different input gestures may be received by the electronic device and converted into the same password digit, which may be useful in obfuscating touchscreen input gestures and password digits from unauthorized users.

A first touchscreen input gesture may include a simple line, a curve, or a simple or complex shape, each of which may be traced while a user continuously contacts the touchscreen with a finger, stylus, or pen. Once continuous contact with the touchscreen ceases, for a predetermined period of time, then the electronic device may detect further contact with the touchscreen as a second touchscreen input gesture. In some embodiments, the predetermined period of time between touchscreen gestures may be set through user interaction with program instructions executable by electronic device.

Figure 2B:
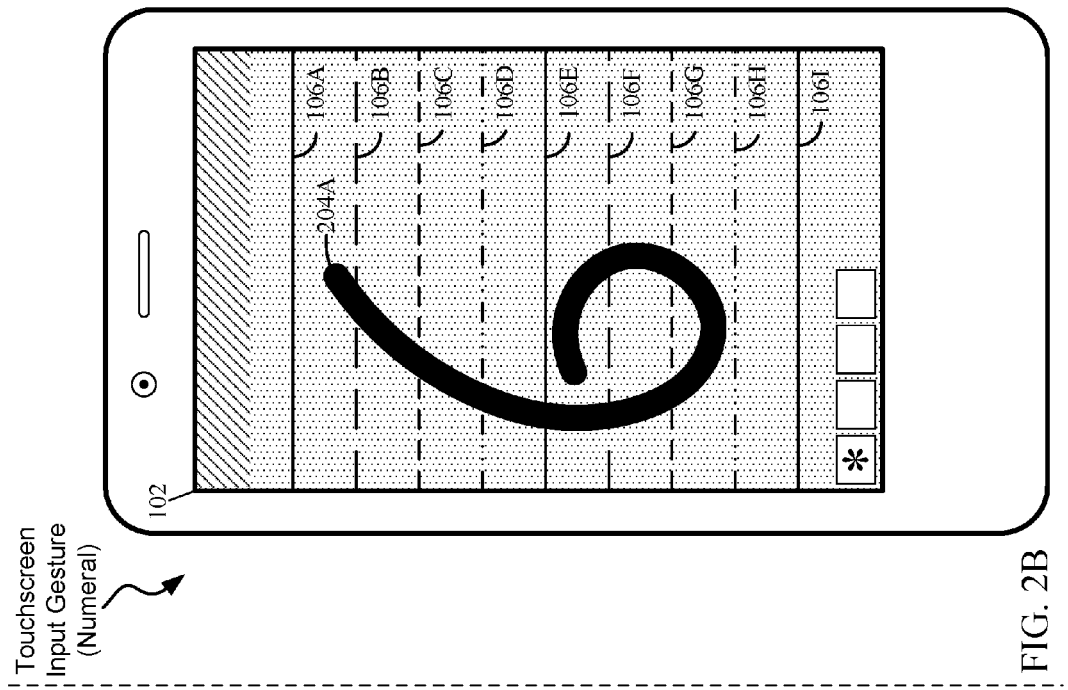
FIG. 2B depicts a touchscreen input gesture resembling a numeral, according to embodiments.
Figure 2A:
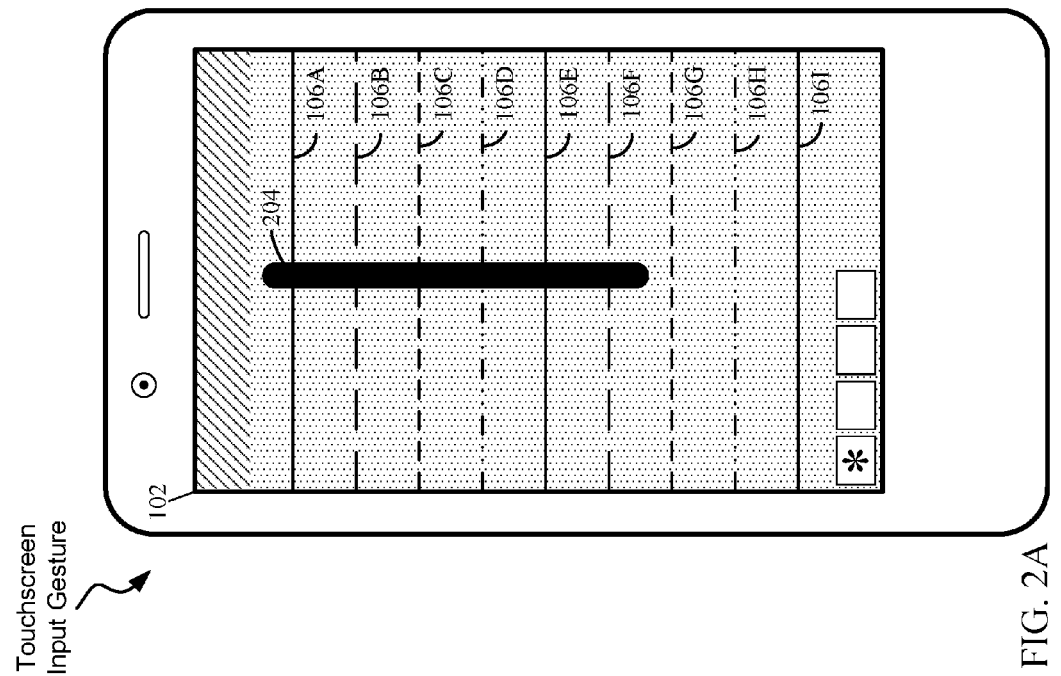
FIG. 2A depicts a touchscreen input gesture, according to embodiments.

FIG. 2A depicts a touchscreen 102 with touchscreen input gesture 204 and displayed guidance lines 106A . . . 106I, consistent with the figures, according to embodiments. In embodiments, a touchscreen input gesture that crosses a number of guidance lines (e.g.; 106A . . . 106I) may be translated into one password digit corresponding to the number of guidance line crossings detected and calculated by the electronic device during the gesture. For example, the input gesture 204, which may cross 6 guidance lines (106A . . . 106F), may be converted to a password digit of "6", according to embodiments. The number of guidance line crossings that may be detected for input gesture 204 may be independent of the direction of the gesture.

FIG. 2B depicts a touchscreen 102 with a touchscreen input gesture 204A resembling a numeral "6" and displayed guidance lines 106A . . . 106I, according to embodiments. The input gesture 204A, which may include 8 detected guidance line crossings (106A . . . 106G), may be converted to a password digit of "8", according to embodiments. In this example, the directional reversal (a first gesture motion, in a first direction, followed by a second gesture motion, in a second direction, opposite to the first direction) of the touchscreen input gesture may cause some of the guidance lines (106E, 106F, 106G) to be crossed more than once per input gesture. Each guidance line crossing, regardless of the crossing direction, may be counted towards the total number of guidance line crossings for an input gesture. The number of guidance line crossings that may be detected for input gesture 204A may be independent of the direction(s) of the gesture. Touchscreen input gestures having similar but symmetrical (mirrored) shapes (e.g.; "9", or a "backwards 6") may be received by the electronic device and converted into the same password digit ("8"), which may be useful in obfuscating touchscreen input gestures and password digits from unauthorized users. A wide variety of different gesture shapes may be used to enter a certain password digit or series of digits. Password digit obfuscation may occur as a result of the shape of the touchscreen input gesture (e.g.;

"9") suggesting a password digit that is different than the converted password digit value (e.g.; "8").

FIG. 3A depicts a touchscreen 102 with a touchscreen input gesture having 2 points of contact and displayed guidance lines 106A . . . 106I, according to embodiments. The touchscreen display 102 may be configured to detect input gesture events which may include simultaneous contact of two or more locations on the touchscreen 102.

Input gesture paths 304A, 304B may represent a user contacting the touchscreen with two fingers during an input gesture. In this example each of the input gesture paths 304A, 304B may cross 6 guidance lines, for a total of 12 guidance line crossings. In embodiments, if the total calculated number of guidance line crossings detected during an input gesture event exceeds 9, then the total calculated number of guidance line crossings may be converted into two password digits, in this example a "1" and a "2". Touchscreen gestures involving 2 or more points of contact with the touchscreen may be useful in concealing the corresponding converted password digit value(s).

FIG. 3B depicts a touchscreen 102 with a "0" touchscreen input gesture 304C and displayed guidance lines 106A . . . 106I, according to embodiments. Touchscreen input gesture 304C may be useful for entering a "0" digit as part of a password to unlock the electronic device. The touchscreen input gesture 304C may include a touchscreen gesture location within a predefined "0" input area 110 of the touchscreen, which may be converted by program instructions within the electronic device into a "0" password digit.

In certain embodiments, program instructions may cause the electronic device to, in response to a delay greater than a predetermined delay between a first input gesture event and a second input gesture event, convert the delay to a "0" password digit. An input gesture including predefined "0" input area 110 of the touchscreen and converting a predetermined delay between gesture events may be useful for entering a "0" digit into the electronic device, and concealing the password from unauthorized users. A length or shape of input gesture 304C may be used to conceal the "0" password digit that it represents to the electronic device.

Figure 4B:
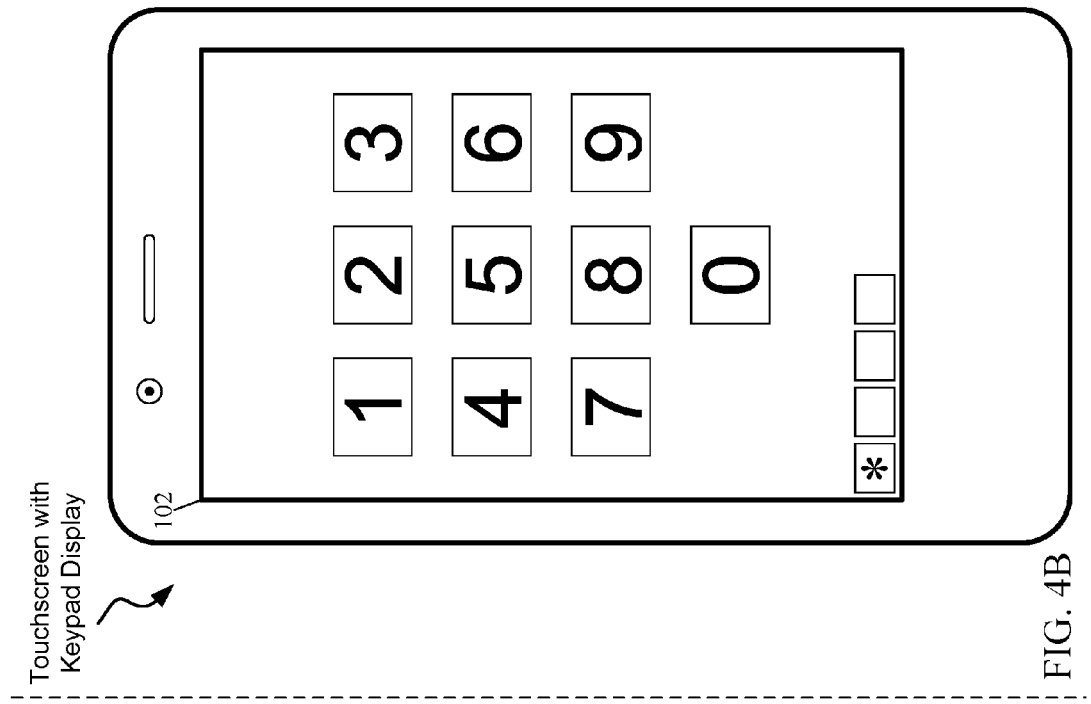
FIG. 4B depicts a touchscreen displaying a numeric keypad input area, according to embodiments.
Figure 4A:
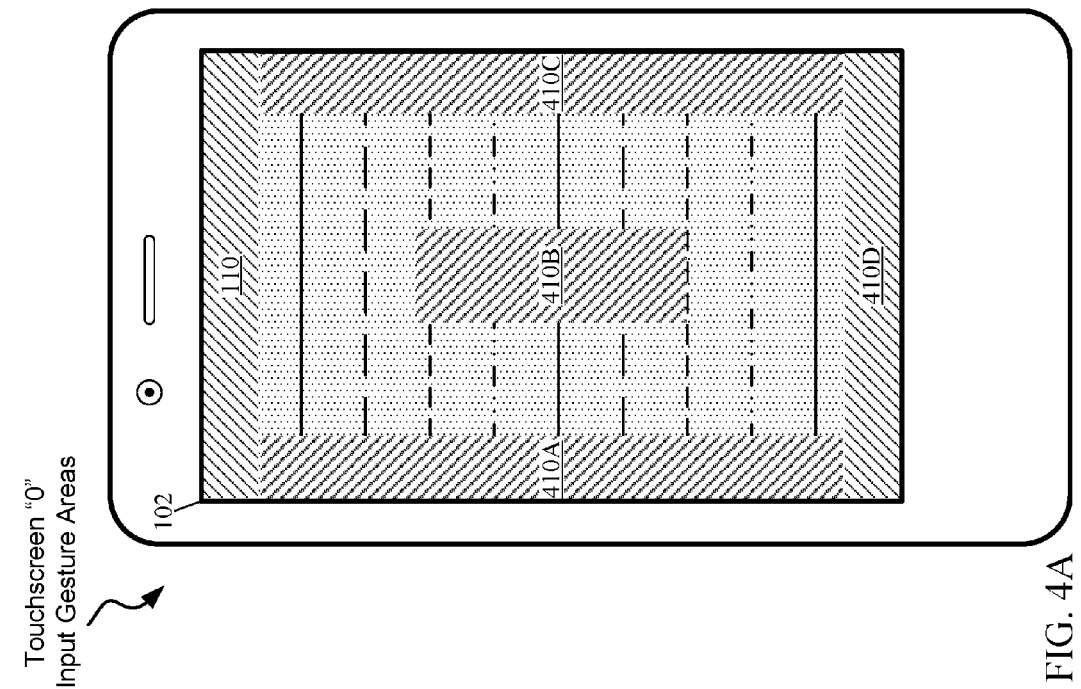
FIG. 4A depicts touchscreen "0" input gesture areas, according to embodiments.

FIG. 4A depicts a touchscreen 102 with "0" input gesture areas 110, 410A, 410B, 410C and 410D, consistent in operation with FIG. 3B, according to embodiments. The "0" input gesture areas 110, 410A, 410B, 410C and 410D represent possible locations for one or more "0" input gesture areas on the touchscreen display 102; others may be possible. Certain embodiments may use one of the depicted "0" input gesture areas, while certain embodiments may use more than one of the areas. Consistent with input gesture 304C (FIG. 3B), an input gesture having a gesture location within one of the "0" input gesture areas may be converted into a "0" password digit by program instructions within the electronic device. Displayed "0" input gesture areas such as 110, 410A . . . 410D may be enabled, moved or disabled, for example, at regular intervals, by the program instructions within the electronic device, which may be useful for concealing input gestures and password digits. Displayed "0" input gesture areas such as 110, 410A . . . 410D may have a coloring or shading that distinguishes them from the remainder of the touchscreen display, and indicates to the user they may be used as "0" input gesture areas. For example, a "0" input gesture area may be colored white, while the remainder of the touchscreen display has a light gray color. Subtle color or shading differences between a "0" input gesture area in the remainder of the touchscreen display may serve to obfuscate these areas to individuals other than the electronic device user. In embodiments, the location of input gesture areas may be customized by an electronic device user.

FIG. 4B depicts a touchscreen 102 displaying a numeric keypad input area, according to embodiments. The touchscreen display 102 may be configured to detect a sequence of input gestures positionally related to numeric keys displayed on the touchscreen, and one or more processor circuits within the electronic device may be configured to convert the input gestures to password digits. The display of a numeric keypad area, and receiving of password digits corresponding to the displayed keypad may be useful for entering password digits as an alternative to touchscreen input gestures that cross guidance lines, in certain circumstances. For example, if a user enters a predetermined number (e.g.; 3) of incorrect password digits using input gestures, program instructions within the electronic device may replace the touchscreen guidance lines display with a numeric keypad display to enable the user to enter a password, according to embodiments. In another example, the display may include a selectable icon that allows a user to switch between using input gestures and the numeric keypad.

Figure 5B:
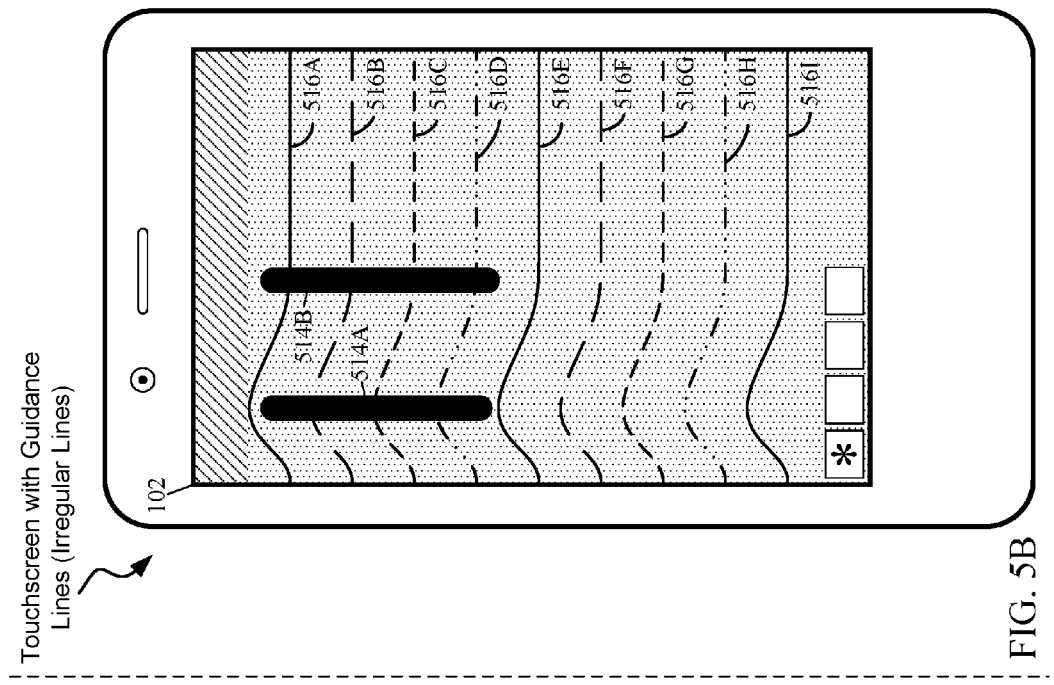
FIG. 5B depicts a touchscreen with irregular shaped guidance lines, according to embodiments.
Figure 5A:
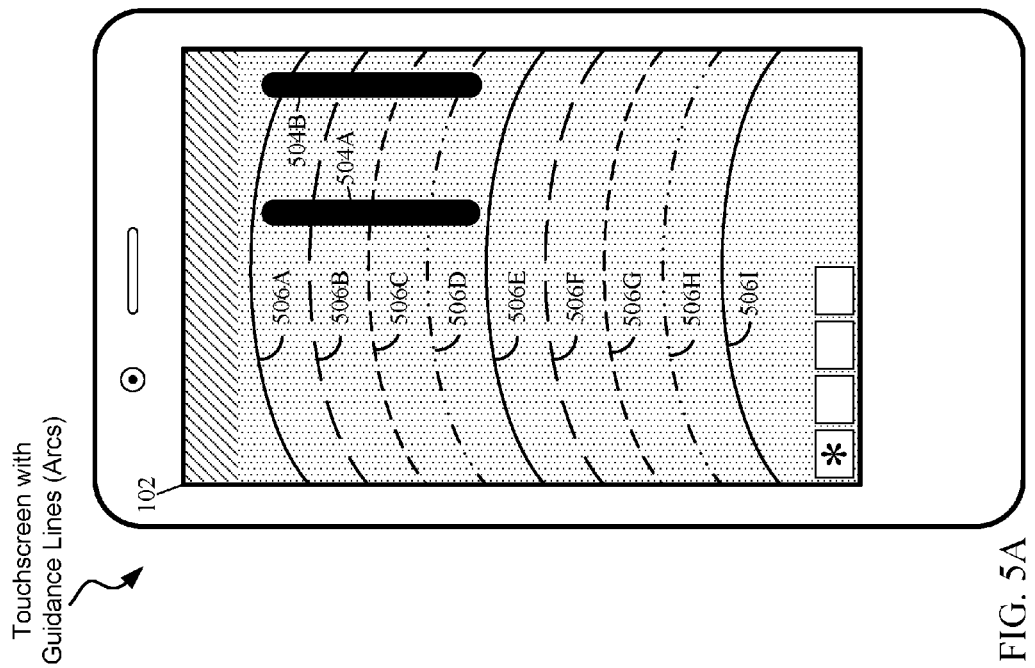
FIG. 5A depicts a touchscreen with curved guidance lines, according to embodiments.

FIG. 5A depicts a touchscreen 102 with curved guidance lines 506A . . . 506I and input gestures 504A, 504B, according to embodiments. The curved guidance lines 506A . . . 506I may be useful in concealing input gestures and entered passwords from unauthorized users of an electronic device. For example, touchscreen input gesture 504A may include 3 guidance line crossings (506B . . . 506D), and may be converted to a password digit of "3", according to embodiments, while a similar, nearby touchscreen input gesture 504B may include 4 guidance line crossings (506A . . . 506D), and may be converted to a password digit of "4", according to embodiments. A person observing a user entering one of these touchscreen input gestures (504A, 504B) may not be able to recognize or discern which gesture was used, or how many guidance lines were crossed during the gesture, as a result of the close similarity of the gestures 504A, 504B, which may be useful for concealing the corresponding password digit(s).

Processor circuits within the electronic device may be configured to change (customize) the guidance line characteristics including the number, shape, color, width, orientation, position and spacing of the curved guidance lines 506A . . . 506I displayed on the touchscreen display 102, according to embodiments. A user may change the customization of these characteristics by interacting with program instructions stored within the electronic device.

FIG. 5B depicts a touchscreen 102 with irregular shaped guidance lines 516A . . . 516I and input gestures 514A, 514B, according to embodiments. The irregular shaped guidance lines 516A . . . 516I may be useful in concealing input gestures and entered passwords from unauthorized users of an electronic device. For example, touchscreen input gesture 514A may include 3 guidance line crossings (516B . . . 516D), and may be converted to a password digit of "3", according to embodiments, while a similar, nearby touchscreen input gesture 514B may include 4 guidance line crossings (516A . . . 516D), and may be converted to a password digit of "4", according to embodiments. A person observing a user entering one of these touchscreen input gestures (514A, 514B) may not be able to recognize or discern which gesture was used, or how many guidance lines were crossed during the gesture, as a result of the close similarity of the gestures 514A, 514B, which may be useful for concealing the corresponding password digit(s).

Figure 6B:
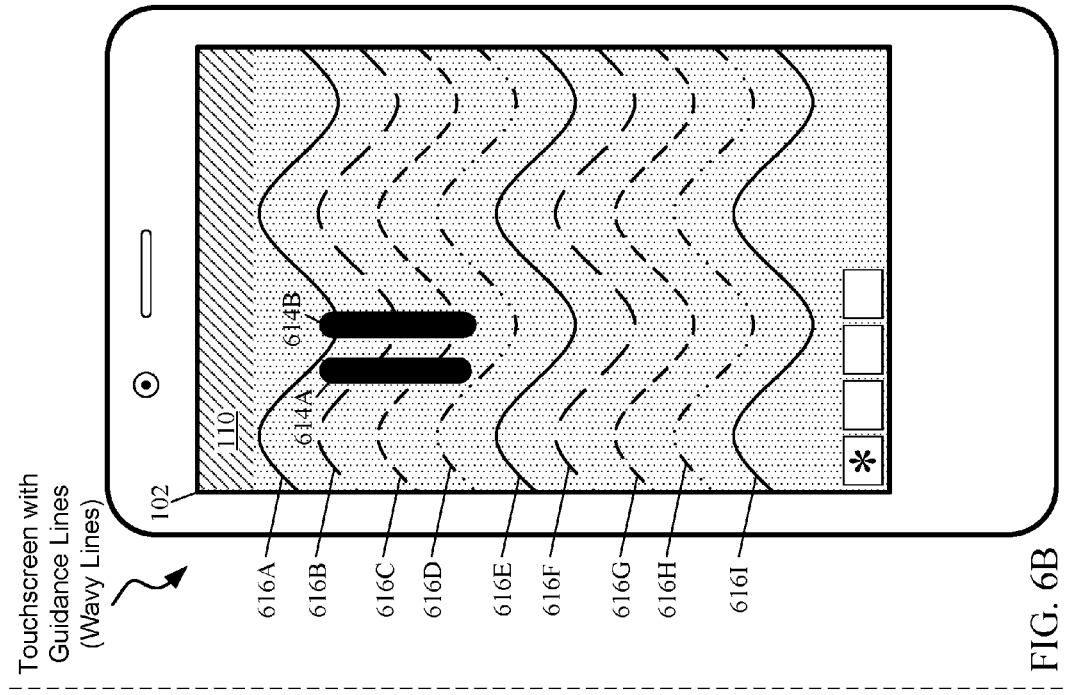
FIG. 6B depicts a touchscreen with regular ("wavy") guidance lines, according to embodiments.
Figure 6A:
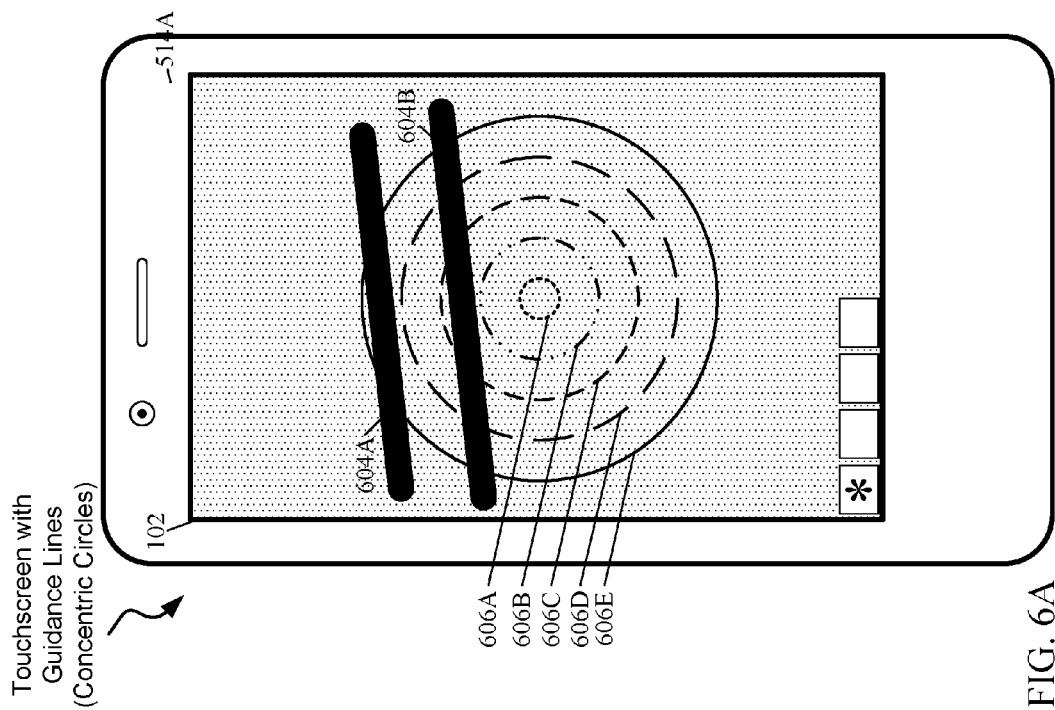
FIG. 6A depicts a touchscreen with concentric circular guidance lines, according to embodiments.

FIG. 6A depicts a touchscreen 102 with concentric circular guidance lines 606A . . . 606E and input gestures 604A, 604B, according to embodiments. The concentric circular guidance lines 606A . . . 606E may be useful in concealing input gestures and entered passwords from unauthorized users of an electronic device. For example, touchscreen input gesture 604A may include 2 guidance line crossings (both 606E), and may be converted to a password digit of "2", according to embodiments, while a similar, nearby touchscreen input gesture 604B may include 6 guidance line crossings (2 each of 606C, 606D, 606E), and may be converted to a password digit of "6", according to embodiments. A person observing a user entering one of these touchscreen input gestures (604A, 604B) may not be able to recognize or discern which gesture was used, or how many guidance lines were crossed during the gesture, as a result of the close similarity of the gestures 604A, 604B, which may be useful for concealing the corresponding password digit(s).

FIG. 6B depicts a touchscreen 102 regular ("wavy") guidance lines 616A . . . 616I and input gestures 614A, 614B, according to embodiments. The regular guidance lines 616A . . . 616I may be useful in concealing input gestures and entered passwords from unauthorized users of an electronic device. For example, touchscreen input gesture 614A may include 2 guidance line crossings (616B, 616C), and may be converted to a password digit of "2", according to embodiments, while a similar, nearby touchscreen input gesture 614B may include 3 guidance line crossings (616A, 616B, 616C), and may be converted to a password digit of "3", according to embodiments. A person observing a user entering one of these touchscreen input gestures (614A, 614B) may not be able to recognize or discern which gesture was used, or how many guidance lines were crossed during the gesture, as a result of the close similarity of the gestures 614A, 614B, which may be useful for concealing the corresponding password digit(s).

Figure 7:
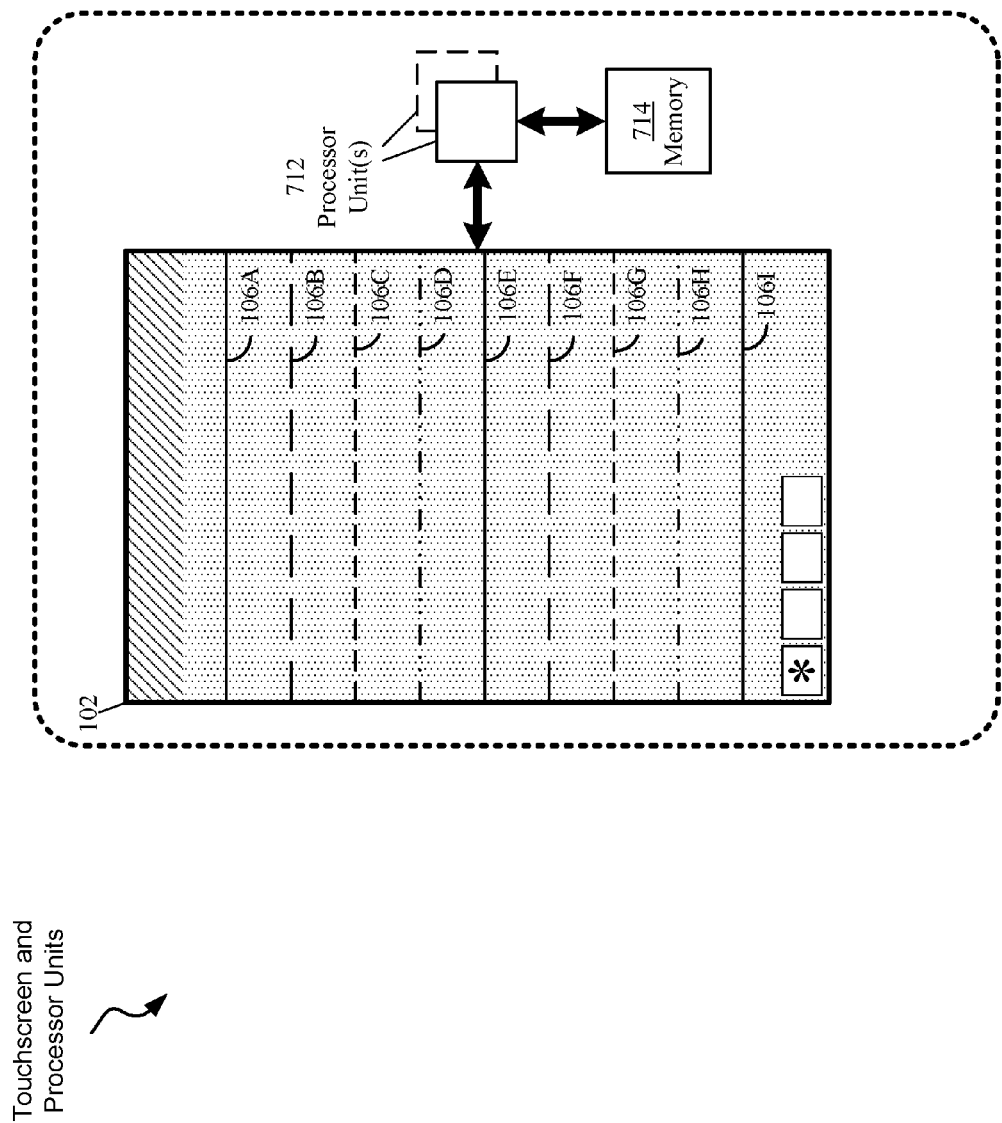
FIG. 7 depicts a touchscreen display and processor units, according to embodiments.

FIG. 7 depicts a touchscreen display 102 of an electronic device with guidance lines 106A . . . 106I, processor unit(s) 712, and memory 714, according to embodiments. The touchscreen 102 may be electrically connected to the processor units 712, and may be useful in receiving information to display from the processor unit(s) 712, and may send touchscreen 102 input information resulting from touchscreen input gestures to the processor units 712.

Touchscreen display 102 may include a controller and firmware configured to detect touchscreen input gestures (such as guidance line crossings) and send information regarding them to processor unit(s) 712. The controller and firmware may also be configured to display information received from processor unit(s) 712, such as text, images and graphics.

Processor unit(s) 712 may be a microprocessor (e.g.; an ARM processor) or other device consistent with processors used in smart phones or other mobile devices, and may be configured to execute program instructions stored in a memory unit 714. Memory unit 714 may be a nonvolatile memory chip or module (a computer readable storage medium), suitable for holding program instructions and data used by processor unit(s) 712.

Program instructions stored in a memory unit 714 may include a computer program product configured to execute the steps for unlocking an electronic device in response to detected touchscreen guidance line crossings, according to embodiments. The steps for unlocking the electronic device may include displaying guidance lines on the touchscreen, calculating a number of guidance line crossings, converting the number of guidance line crossings into a password digit, comparing a password digit sequence with a stored password and unlocking the electronic device, consistent with steps described herein, and particularly with reference to FIG. 8.

Processor unit(s) 712 may be configured to change at least one guidance line characteristic such as the number, shape, color, width, orientation, position and spacing of the guidance lines displayed on the touchscreen display. Processor unit(s) 712 may be configured to change at least one guidance line characteristic at a regular time interval (which a user may specify), at a random time interval, or in response to the electronic device entering the locked state.

Figure 8:
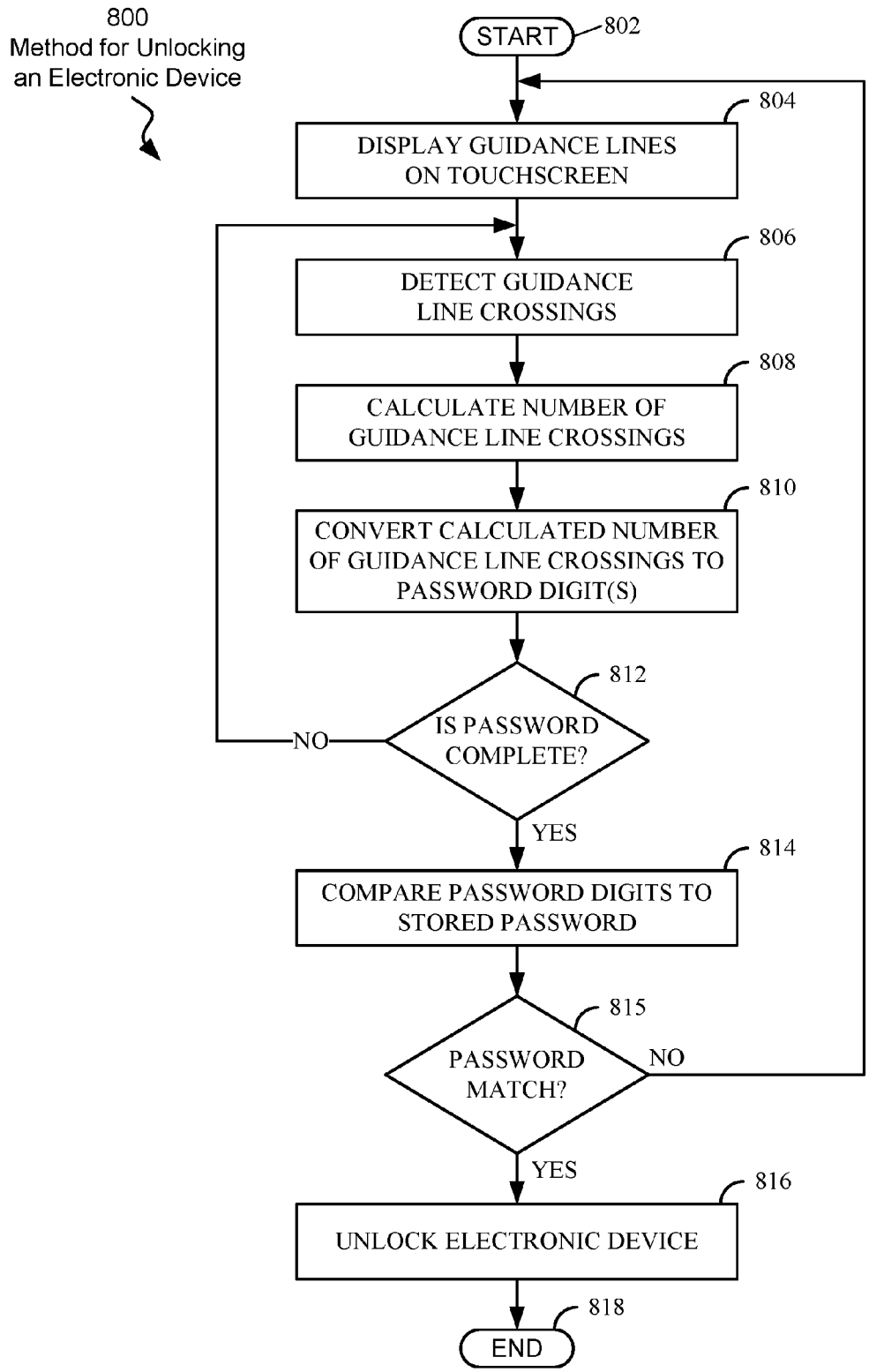
FIG. 8 is a flow diagram illustrating steps for unlocking an electronic device in response to detected touchscreen guidance line crossings, according to embodiments.

FIG. 8 is a flow diagram, consistent with the figures, which illustrates steps for unlocking an electronic device in response to detected touchscreen guidance line crossings, according to embodiments. The process 800 moves from start 802 to operation 804.

Operation 804 generally refers to the step of displaying a plurality of guidance lines on the touchscreen of the electronic device while the electronic device is in a locked state. Consistent with the figures and their associated descriptions, the guidance lines may be displayed having a variety of characteristics including shapes, colors, widths, orientations, positions and spacings. Guidance line characteristics may be customized by a user or changed by the electronic device at regular or irregular time intervals, and/or when the electronic device is placed in a locked state. The variety of guidance line characteristics which may be displayed, in conjunction with changes to the characteristics, may be useful in obfuscating the (converted) value of a password digit associated with a touchscreen input gesture. Once plurality of guidance lines are displayed on the touchscreen of the electronic device, the process moves to operation 806.

Operation 806 generally refers to the step of detecting guidance line crossings during an input gesture event. A guidance line crossing may be detected when a user's finger or stylus crosses from one side of a guidance line to another side of the guidance line while in contact with the touchscreen. Guidance line crossings may be detected regardless of the direction of the crossing, and an input gesture may include multiple guidance line crossings. Input gesture shapes may include straight, curved, circular, or may include the outline of numeral, letter, or other shape. The variety of input gesture shapes which may produce detectable guidance line crossings may be useful in obfuscating the (converted) value of a password digit associated with an input gesture. Once guidance line crossings have been detected during an input gesture event, the process moves to operation 808.

Operation 808 generally refers to the step calculating a number of guidance line crossings detected during an input gesture event. An input gesture event may be determined, by the electronic device, to be completed after a predetermined time interval elapses following the last detected guidance line crossing or from the last detected contact of a finger or stylus with the touchscreen. For example, a time period of 1 second may be used as the predetermined time interval, after which the electronic device may begin calculating the number of guidance line crossings detected during the input gesture event. The predetermined time interval may be customizable by a user. After the number of guidance line crossings detected has been calculated, the process moves to operation 810.

Operation 810 generally refers to the step of converting the calculated number of detected guidance line crossings into at least one password digit. The number of detected guidance line crossings may be a total number resulting from input gestures having one or more points of contact on the touchscreen. For example, if an input gesture involves a user contacting the screen with 2 fingers, then all guidance line crossings involving both fingers may be included in the total calculated number of detected guidance line crossings.

In certain embodiments, if the calculated number of detected line crossings is greater than the number of guidance lines displayed on the touchscreen, for example 9, the electronic device may convert number of detected guidance line crossings into two or more password digits. For example if 12 guidance line crossings are detected corresponding to an input gesture event, the electronic device may convert a calculated number into the password digits "1", "2".

In some embodiments, the electronic device may multiply the calculated number of detected guidance line crossings by a numerical weighting value, and subsequently convert the resulting product into a calculated number of guidance line crossings. For example, if 6 guidance line crossings are detected during an input gesture event, and the numerical weighting value is 2, then the subsequent calculated number of guidance line crossings may be 12. After the calculated number of detected guidance line crossings are converted into at least one password digit, the process moves to decision 812.

At operation 812, the total number of password digits generated by operation 810 is compared against the number of digits in a password stored within the electronic device. If the total number of password digits generated by operation 810 is equal the number of digits in a password stored within the electronic device, the process moves to block 814. The process may also move to block 814 in response to an "enter" or "confirm" touchscreen input gesture (possibly positionally related to an "enter" key being displayed on the touchscreen) being received as an indicator from the user that the password entry is complete. If the total number of password digits generated by operation 810 is not equal to the number of digits in a password stored within the electronic device, the process returns to operation 806.

Operation 814 generally refers to the step of comparing a sequence of password digits entered through touchscreen input gestures and converted by operation 810 to a stored password in the electronic device. After the sequence of password digits is compared to the stored password, the process moves to decision 815.

At decision 815, if the entered sequence of password digits matches the password stored within the electronic device, the process moves to block 816. If the entered sequence of password digits does not match the password stored within the electronic device, the process returns to operation 804.

Operation 816 generally refers to the step of unlocking the electronic device in response to a match of the sequence of password digits is compared to the stored password of operation 814. The electronic device may be placed in a usable state, which may allow the user to access resources within the device, such as sensitive data, applications and operating system functions. After the electronic device is unlocked, the process 800 may end at block 818.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for detecting input gesture events on a touchscreen of a smartphone and for unlocking the smartphone, the system comprising:
 a memory; and
 a processor in communication with the memory, the processor configured to obtain instructions from the memory that cause the processor to perform a method comprising:
  displaying, while the smartphone is in a locked state, a plurality of guidance lines on the touchscreen of the smartphone, the plurality of guidance lines displayed in a plurality of colors;
  detecting, during an input gesture event, guidance line crossings, the guidance line crossings including a transition of the input gesture event from a first side of a guidance line to a second side of the guidance line;
  calculating a number of guidance line crossings detected during the input gesture event;
  converting the number of guidance line crossings into at least one password digit, the converting including multiplying the number of guidance line crossings by a numerical weighting value of 2;
  comparing a sequence of password digits including the at least one password digit to a password stored in the smartphone; and
  unlocking, in response to comparing the sequence of password digits to the stored password, the smartphone.

* * * * *